US012727529B2

(12) United States Patent
Dombrowski et al.

(10) Patent No.: US 12,727,529 B2
(45) Date of Patent: Sep. 8, 2026

(54) VEHICLE WITH DECK ALIGNMENT

(71) Applicant: Transform SR Brands LLC, Hoffman Estates, IL (US)

(72) Inventors: Kenneth Joseph Dombrowski, Elgin, IL (US); Grant Kiel, South Elgin, IL (US); Brian Todd Reese, St. Charles, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 18/612,056

(22) Filed: Mar. 21, 2024

(65) Prior Publication Data

US 2024/0224847 A1 Jul. 11, 2024

Related U.S. Application Data

(63) Continuation of application No. 18/320,541, filed on May 19, 2023, now Pat. No. 11,997,943, which is a continuation of application No. 16/694,208, filed on Nov. 25, 2019, now Pat. No. 11,700,785, which is a continuation of application No. 15/820,664, filed on Nov. 22, 2017, now Pat. No. 10,485,163, which is a continuation of application No. 15/000,486, filed on Jan. 19, 2016, now Pat. No. 9,844,175.

(51) Int. Cl.

| | |
|---|---|
| ***A01D 34/00*** | (2006.01) |
| ***A01D 34/64*** | (2006.01) |
| ***A01D 34/66*** | (2006.01) |
| ***A01D 34/74*** | (2006.01) |
| ***A01D 101/00*** | (2006.01) |
| ***B60C 23/06*** | (2006.01) |

(52) U.S. Cl.
CPC ......... *A01D 34/006* (2013.01); *A01D 34/008* (2013.01); *A01D 34/64* (2013.01); *A01D 34/661* (2013.01); *A01D 34/74* (2013.01); *B60C 23/06* (2013.01); *A01D 2101/00* (2013.01)

(58) Field of Classification Search
CPC .... B60C 23/06; A01D 34/006; A01D 34/008; A01D 34/64
USPC .......................................................... 340/442
See application file for complete search history.

(56) References Cited

U.S. PATENT DOCUMENTS

| | | | |
|---|---|---|---|
| 3,269,100 | A | 8/1966 | Smith |
| 5,581,986 | A | 12/1996 | Calver |
| 9,844,175 | B2 | 12/2017 | Dombrowski et al. |
| 10,485,163 | B2 | 11/2019 | Dombrowski et al. |
| 2002/0040570 | A1 | 4/2002 | Walker et al. |
| 2005/0257508 | A1 | 11/2005 | Modzik et al. |

(Continued)

*Primary Examiner* — Kam Wan Ma
(74) *Attorney, Agent, or Firm* — McAndrews Held & Malloy, Ltd.

(57) ABSTRACT

A lawn mowing apparatus may include sensors that are fastened to both its mower deck and its chassis. The sensors may sense a position of the mower deck in relation to the chassis. The sensed position of the mower deck may be presented to the operator via a dashboard display of the lawn tractor or transmitted via a wireless signal to another device. Based on such sensed position, an operator of the lawn tractor may manually adjust the position of the mower deck until the sensed position of the mower deck is within an acceptable operating range. In some embodiments, servo-motors may used to adjust the position of the mower deck until the sensed position of the mower deck is within an acceptable range.

18 Claims, 7 Drawing Sheets

(56) References Cited

U.S. PATENT DOCUMENTS

| | | | | |
|---|---|---|---|---|
| 2008/0077293 | A1* | 3/2008 | Fitzgibbons ....... | B60G 17/0185 280/5.514 |
| 2008/0269995 | A1 | 10/2008 | Brandon et al. | |
| 2010/0131147 | A1* | 5/2010 | Donnelli ................ | G07C 5/008 701/31.4 |
| 2011/0202229 | A1* | 8/2011 | Owens ................ | B60C 23/0406 701/31.4 |
| 2012/0112896 | A1 | 5/2012 | Clair et al. | |
| 2014/0041352 | A1 | 2/2014 | Johnson | |
| 2014/0257623 | A1 | 9/2014 | Carl | |
| 2015/0234580 | A1* | 8/2015 | Secord ................ | G06F 3/04847 715/771 |
| 2016/0316619 | A1 | 11/2016 | Johanek et al. | |
| 2016/0318354 | A1* | 11/2016 | Trostle .............. | B60C 23/00354 |

* cited by examiner

| Chassis Angle (deg) | | Deck Angle (deg) | | Adjust By |
|---|---|---|---|---|
| Front to Back | 0.34 | Front to Back | -1.44 | 1.78 |
| Side to Side | 0.19 | Side to Side | 2.7 | -2.51 |

FIG. 7

VEHICLE WITH DECK ALIGNMENT

The present application is a continuation of U.S. application Ser. No. 18/320,541, filed May 19, 2023, which is a continuation of U.S. application Ser. No. 16/694,208, filed Nov. 25, 2019 (now U.S. Pat. No. 11,700,785), which is a continuation of U.S. application Ser. No. 15/820,664, filed Nov. 22, 2017 (now U.S. Pat. No. 10,485,163), which is a continuation of U.S. application Ser. No. 15/000,486, filed Jan. 19, 2016 (now U.S. Pat. No. 9,844,175). The aforementioned documents are hereby incorporated herein by reference in their entirety.

FIELD OF THE INVENTION

Various embodiments relate to an apparatus for mowing a lawn, and more particularly, to sensing whether a mower deck of such an apparatus is properly aligned.

BACKGROUND OF THE INVENTION

The correct position of the mower deck of a lawn tractor or riding lawn mower has a direct relationship to the quality of cut. In particular, poor positioning or alignment of the mower deck creates an uneven cut. While the mower deck may be proper positioned at the factory, the mower deck is likely to become misaligned as a result of use. Accordingly, periodic adjustment of the position of the mower deck may help maintain a quality cut.

Limitations and disadvantages of conventional and traditional approaches should become apparent to one of skill in the art, through comparison of such systems with aspects of the embodiments set forth in the remainder of the present application.

BRIEF SUMMARY OF THE INVENTION

Apparatus for mowing a lawn and methods for sensing alignment of a mower deck are substantially shown in and/or described in connection with at least one of the figures, and are set forth more completely in the claims.

Advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

FIG. 7 shows details of an example display that presents chassis and mower deck alignment information.

DETAILED DESCRIPTION OF THE INVENTION

Aspects of the present invention are generally related to an apparatus for mowing a lawn, and more particularly, to sensing whether a mower deck of such an apparatus is proper aligned. The following description focuses upon an embodiment of a lawn tractor having a mower deck that which may be used to mow a lawn. However, various aspects of the disclosed sensing techniques may be applicable to a wider range of lawn mowing apparatus, such as, for example, self-propelled lawn mowers, riding lawn mowers, zero turn tractors, wheeled trimmers, and the like.

As described in more detail below, a lawn tractor may include sensors that are attached to or otherwise associated with a mower deck and chassis of the lawn tractor. The sensors may sense a position of the mower deck in relation to the chassis. The sensed position of the mower deck may be presented to the operator via a dashboard display of the lawn tractor or transmitted via Bluetooth or other wireless signal to another presentation device, such as a smart phone, tablet, desktop, laptop, display monitor, television, or other display device, for presentation to the operator. Based on such sensed position, an operator of the lawn tractor may manually adjust the position of the mower deck until the sensed position of the mower deck is within an acceptable operating range. In some embodiments, servomotors may be used to adjust the position of the mower deck until the sensed position of the mower deck is within an acceptable range.

By monitoring the position of the chassis, the chassis sensor may indirectly monitor pressure in tires of the lawn tractor. Variances in tire pressure may result in variances in the tilt of the chassis. As such, based on variances in a sensed position of the chassis, a tire pressure alert may be generated and presented to the operator. In some embodiment, a controller may generate one or more control signals that cause a compressor to inflate tire(s) which are detected as being underinflated.

Figure 1:
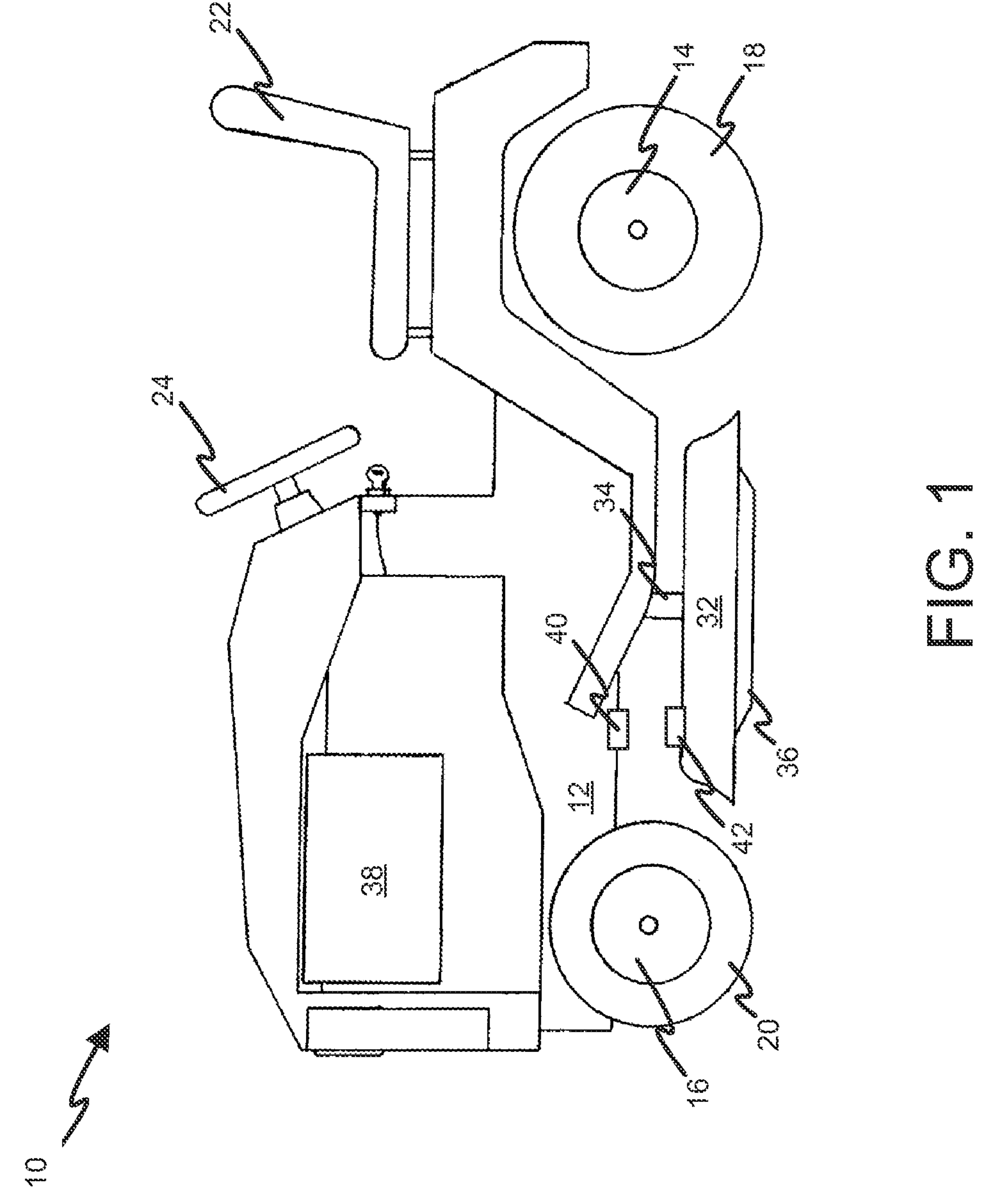
FIG. 1 shows a lawn mowing apparatus in the form of a lawn tractor having a chassis and a mower deck.

Referring now FIG. 1, an example embodiment of a lawn tractor 10 is shown. The lawn tractor 10 may include a chassis 12 supported by two rear wheels 14 and two front wheels 16 and their respective inflatable tires 18, 20. The lawn tractor 10 may further include a driver's seat 22 and a steering wheel 24. The steering wheel 24 may be mechanically coupled to the front wheels 16 to provide steering control to an operator sitting in the driver's seat 22.

As shown, the lawn tractor 10 may also include a mower deck 32 supported by the chassis 12 via adjustable linkage 34. The mower deck 32 may include one or more blades 36 for mowing a lawn. Furthermore, the lawn tractor 10 may include an engine 38. The engine 38 may be mechanically coupled to the rear wheels 14, the front wheels 16, or both in order to provide driving torque to such wheels 14, 16 and impart the lawn tractor 10 with locomotion. The engine 38 may be further mechanically coupled to the one or more blades 36 of the mower deck 32 to rotate the blades 36 such that the blades 36 cut grass and mow the lawn.

The lawn tractor 10 further includes at least two position sensors 40, 42. A first position sensor 40 is attached or otherwise affixed to the chassis 12 and a second position sensor 42 is attached or otherwise affixed to the mower deck 32. To this end, each of the position sensors 40, 42 in one embodiment includes a gyroscopic sensor that senses the three rotational axes of yaw, pitch, and roll for its respective chassis 12 or mower deck 32. Moreover, the position sensors 40, 42 may generate one or more signals indicative of the sensed rotational axes. In other embodiments, the position sensors 40, 42 may be implemented using other types of sensors such, for example, linear position sensors, angular sensors, tilt sensors, Hall effect sensors, rotary position sensors, inclinometers, clinometers, and multi-axis position sensors. Furthermore, the adjustable linkage 34 may only permit adjustments to the pitch and roll of the mower deck 32. In such embodiments, the position sensors 40, 42 may sense and generate signals only with respect to two rotational axes of interest, namely, pitch and roll.

Figure 2:
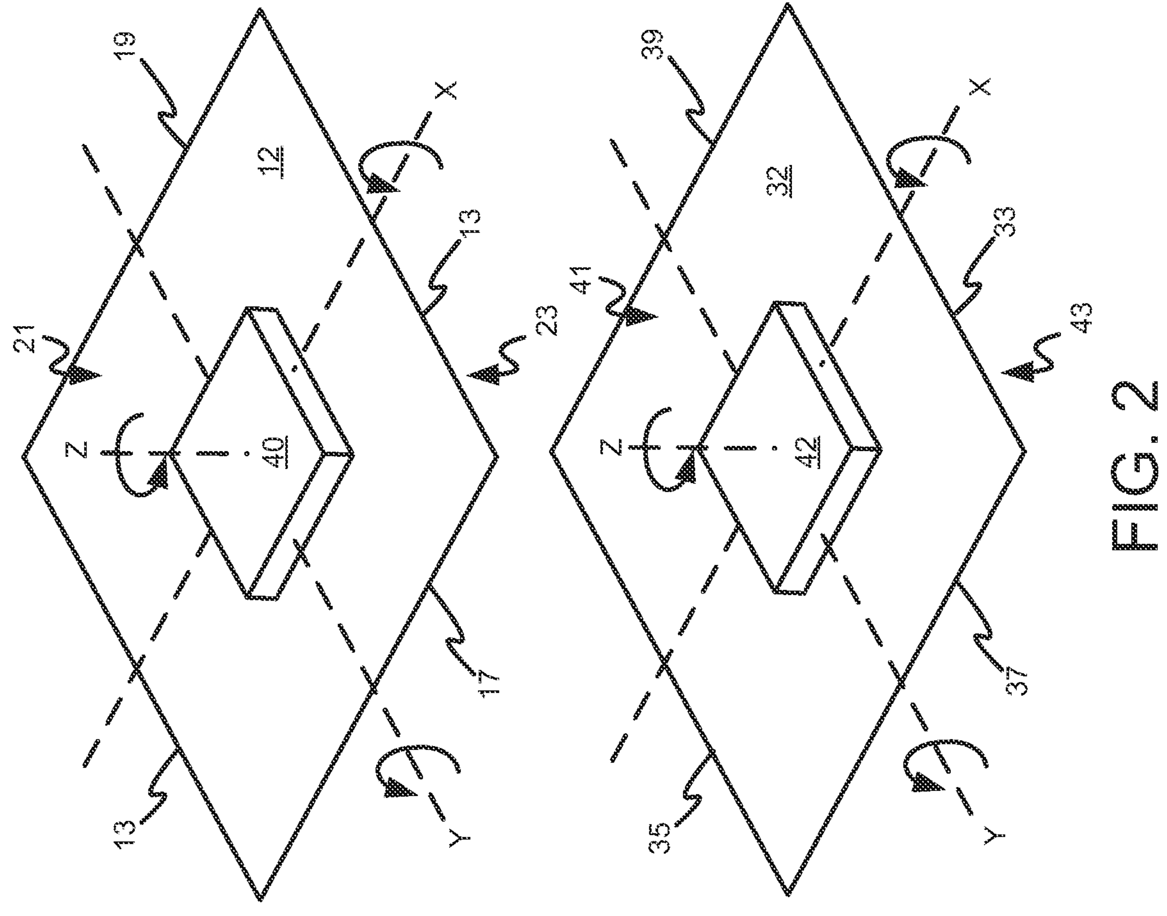
FIG. 2 depicts a three-axis relationship of the position sensors for the chassis and mower deck of FIG. 1.

As shown in FIG. 2, the first position sensor 40 may be attached to the chassis 12 such that the first position sensor 40 senses the yaw, pitch, and roll of the chassis 12. The pitch of the chassis 12 corresponds to rotation of the chassis 12 about an X-axis that runs horizontally through a left side 13 and right side 15 of the chassis 12. The roll of the chassis 12 corresponds to rotation of the chassis 12 about a Y-axis that runs horizontally through a front end 17 and rear end 19 of the chassis 12. The yaw of the chassis 12 corresponds to rotation of the chassis 12 about a Z-axis that runs vertically through a top side 21 and bottom side 23 of the chassis 12.

Similarly, the second position sensor 42 may be attached to the mower deck 32 in a manner that permits the second position sensor 42 to sense the yaw, pitch, and roll of the mower deck 32. The pitch of the mower deck 32 corresponds to rotation of the mower deck 32 about an X-axis that runs horizontally through a left side 33 and right side 35 of the mower deck 32. The roll of the mower deck 32 corresponds to rotation of the mower deck 32 about a Y-axis that runs horizontally through a front end 37 and rear end 39 of the mower deck 32. The yaw of the mower deck 32 corresponds to rotation of the mower deck 32 about a Z-axis that runs vertically through a top side 41 and bottom side 43 of the mower deck 32.

Figure 3:
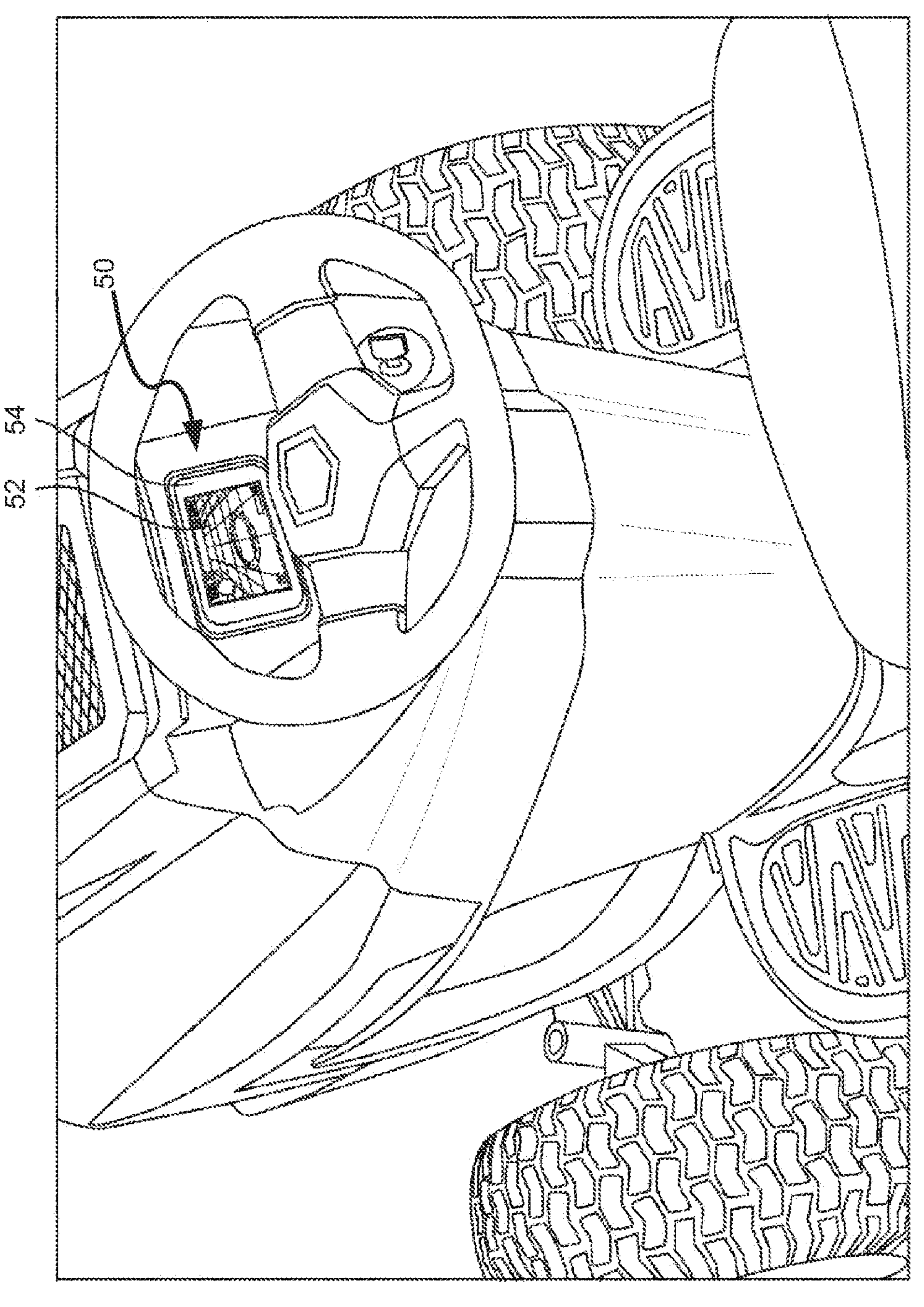
FIG. 3 shows details regarding a dashboard for the lawn tractor of FIG. 1.

Referring now to FIG. 3, a perspective view of a dashboard 50 of the tractor 10 is shown. The dashboard 50 may include a display device 52 that is configured to present information to an operator of the lawn tractor 10. In some embodiments, the dashboard 50 may be configured to receive a presentation device 54 such as, for example, a smart phone, tablet, or other portable computing device and mount such presentation device 54 to the lawn tractor 10. In such an embodiment, the presentation device 54 may provide the display device 52 used to present information to the operator of the lawn tractor 10. In other embodiments, the presentation device 54 may comprises a smart phone, tablet, laptop, desktop, monitor, television or some other display device distinct from the dashboard 50 and/or lawn tractor 10, which are capable of receiving information from the lawn tractor 50 and presenting such information to an operator of the lawn tractor 50.

Figure 4:
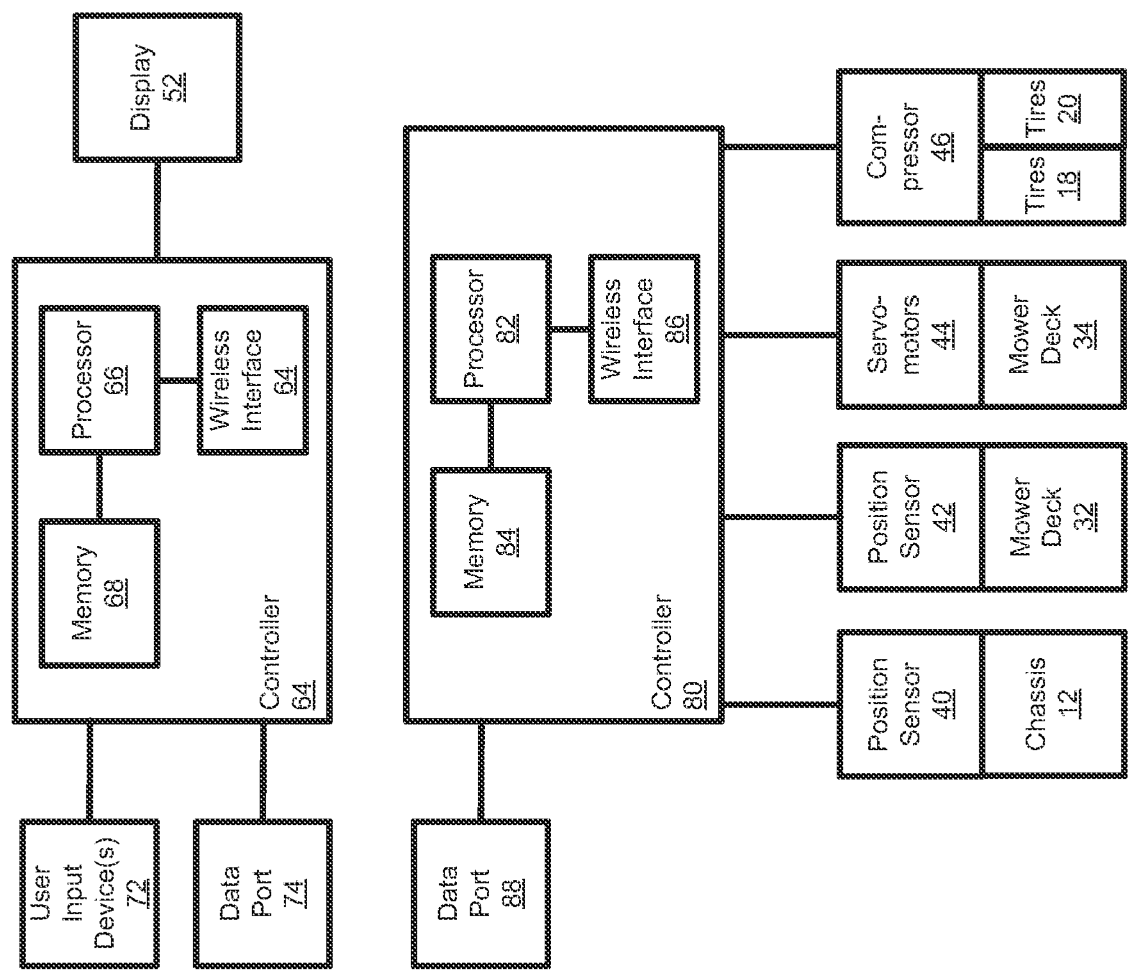
FIG. 4 provides a block diagram depicts aspects of a controller and its relationship to the dashboard and sensors of FIGS. 2-3.

Referring now to FIG. 4, additional details concerning the dashboard 50 and a control aspects of the lawn tractor 10 are shown. As shown, the dashboard 50, regardless of whether implemented with a separated presentation device 54 or as an integrated display, may include a controller 64 having a processor 66, a memory 68, and a wireless communications interface 70. The memory 68 may store instructions and other information to be executed or used by the processor 66.

The processor 66 may be configured to execute and access the instructions and other information stored in the memory 68. In response to such execution, the processor 66 may control the display of information on display device 52. Additionally, the processor 66 may receive input from the operator of the lawn tractor via one or more user input devices 72 of the dashboard 50. For example, the processor 66 may receive input via a button, keypad, touch screen, or other device of the user input devices 72.

As shown, the lawn tractor 10 may further include another controller 80. The controller 80 may also include a processor 82, a memory 84, and a wireless communications interface 86. The memory 84 may store instructions and other information to be executed and used by the processor 82. The processor 82 may be configured to execute the instructions and access the other information stored in the memory 84.

The wireless communications interface 86 of tractor controller 80 may be configured to send and/or receive wireless signals to/from the wireless communications interface 70 of the dashboard controller 64. Additionally, the tractor controller 80 may also include a data port 88, such as, for example, a port or cable that may be used in the delivery of information from the tractor controller 80 to dashboard controller 64, another system, device, machine, or other non-transitory computer-readable storage medium. For example, the data port 88 may be a USB port that permits a wired connection with a data port 74 of the dashboard 50.

The tractor controller 80 may be operably connected to the position sensors 40, 42 that provide information relating to position of the chassis 12 and mower deck 32. Such connection between the tractor controller 80 and the sensors 40, 42 may include a wired connection and/or a wireless connection, including, for example, through the use of a Bluetooth enumerator bus. However, according to other embodiments, the sensors 40, 42 may include a transmitter, such as a smart sensor, that allows for the transmission of information sensed by the sensor 40, 42 to the tractor controller 80.

Information or data provided by the sensors 40, 42 may be used by the processor 62 of the tractor controller 80 to determine whether the mower deck 32 is properly aligned with the chassis 12. The processor 62 may further determine from such information whether the tires of the lawn tractor 10 are properly inflated.

The processor 62 may be further coupled to a plurality of servomotors 44 associated with the linkage 34 and an air compressor 46 associated with tires 18, 20. In particular, the processor 62 may generate one or more control signals to cause the servomotors 44 to adjust linkage 34 and the position of the mower deck 32 with respect to the chassis 12. Similarly, the processor 62 may generate one or more control signals to cause the air compressor 46 to inflate one or more tires 18, 20 and adjust the position of the chassis 12 with respect to the surface upon which the lawn tractor 10 is resting.

Figure 5:
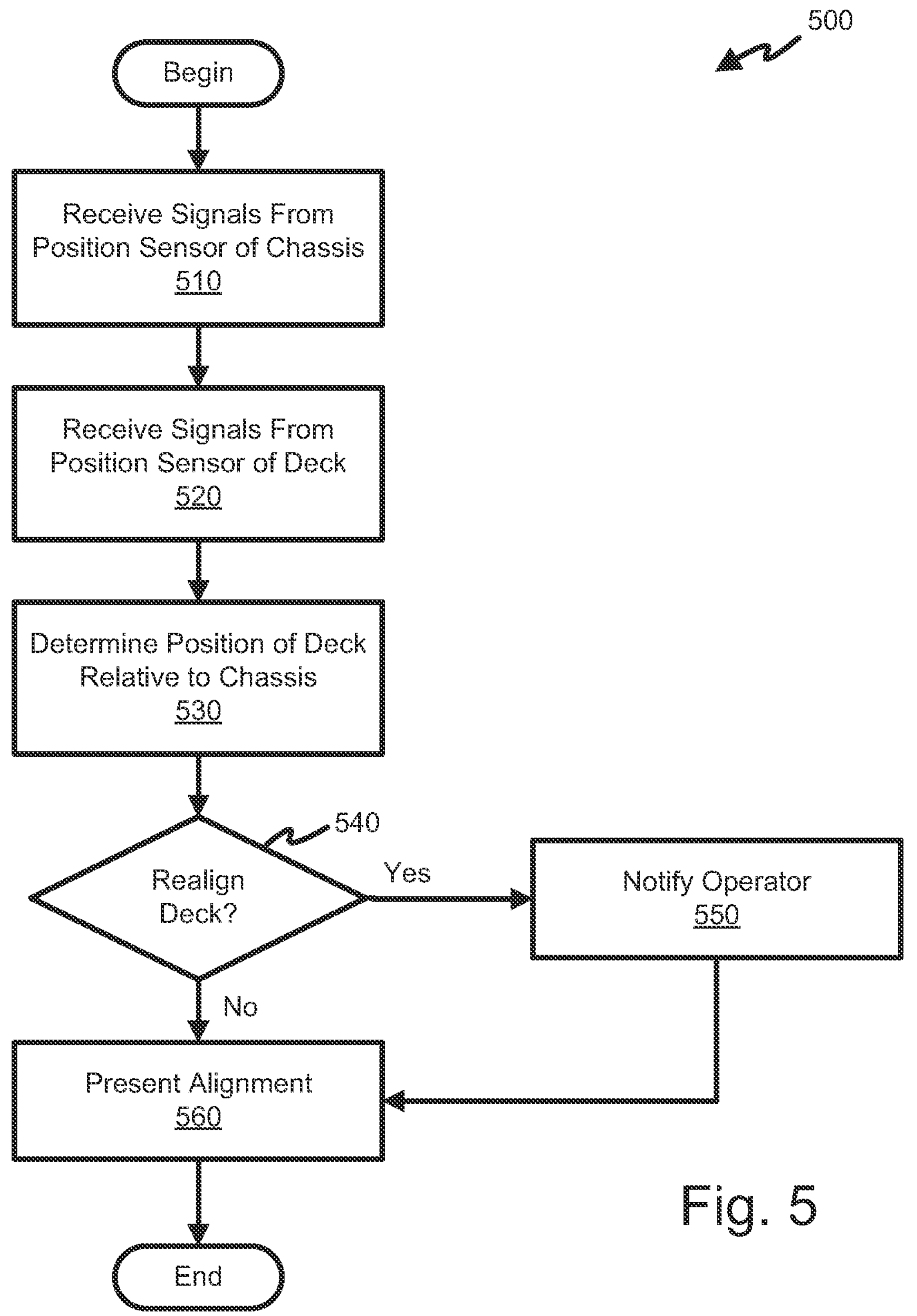
FIG. 5 shows a flowchart for an example method which may be implemented by the controller of FIG. 4 in order to detect misalignment of the mower deck.

Referring now to FIG. 5, a flowchart is depicted for an example method 500 for detecting whether adjustment of the mower deck 32 is warranted. As shown, the controller 80 at 510 may receive one or more signals from the position sensor 40 attached to the chassis 12. The signals received from the position sensor 40 may be indicative of a position of a chassis 12. In particular, the signals may be indicative of the tilt or the yaw, pitch, and roll of the chassis 12. At 520, the controller 80 may receive one or more signals from the position sensor 42 attached to the mower deck 32. The signals received from the position sensor 42 may be indicative of a position of a mower deck 32. In particular, the signals may be indicative of the tilt or the yaw, pitch, and roll of the mower deck 32.

At 530, the controller 80 may determine, based on the signals received from the position sensors 40, 42, a relative position of the mower deck 32 with respect to the chassis 12. To this end, the controller 80 may subtract values for the yaw, pitch, and roll of the mower deck 32 from values for the yaw, pitch, and roll for the chassis 12 to obtain differential yaw, pitch, and roll values that are indicative of a difference in tilt between the chassis 12 and the mower deck 32.

The controller 80 at 540 may determine, based upon the determined relative position of the mower deck 32 to the chassis, whether realignment of the mower deck is warranted. To this end, the controller 80 may determine that realignment is warranted in response to determining that the difference in tilt, yaw, pitch, or roll between the chassis 12 and the mower deck 32 is greater than a respective threshold.

If the controller 80 determines at 540 that realignment is warranted, the controller at 550 may notify the operator that realignment of the mower deck 32 is warranted. To this end, the controller 80 may transmit one or more signals to the dashboard 50 to cause the dashboard 50 to display or otherwise present a notification that realignment of the mower deck 32 is warranted. Regardless of whether realignment is warranted, the controller 80 at 560 may transmit one or more signals to the dashboard 50 or presentation device 54 to cause the dashboard 50 or presentation device 54 to present information regarding the current positions of the chassis 12, the mower deck 32, and an amount of adjustment, if any, needed in order to properly align the mower deck 32. See, for example FIG. 7 which presents an example presentation.

Figure 7:
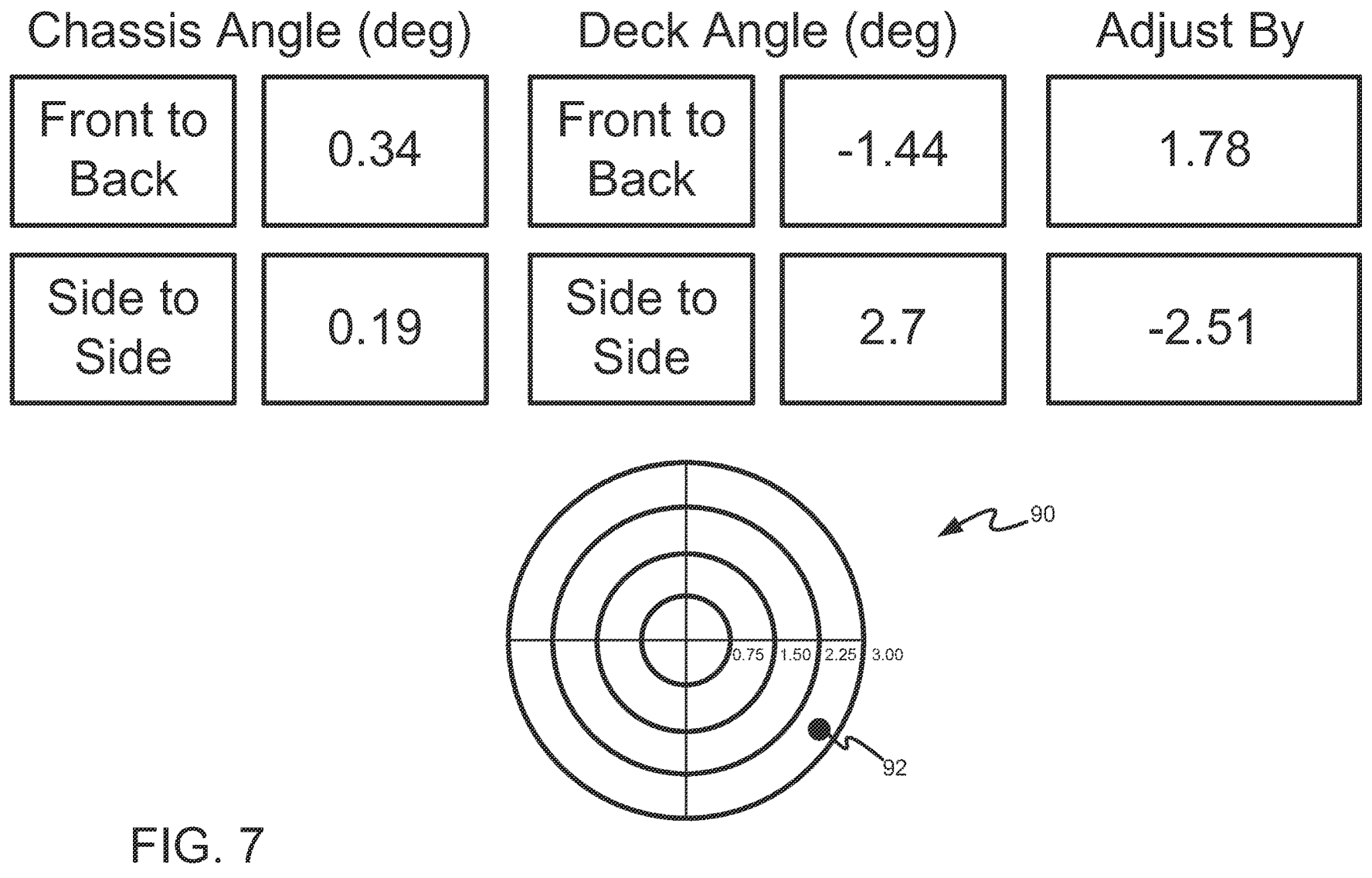

As shown in FIG. 7, the dashboard 50 may present the front to back angle or pitch of the chassis 12 and the side to side angle or roll of the chassis 12 in degrees. Similarly, the dashboard 50 may present the front to back angle or pitch of the deck 32 and the side to side angle or roll of the deck 32 in degrees. Moreover, the dashboard 50 may present the difference between the tilt of the mower deck 32 and the chassis 12 as a number of degrees the mower deck 32 is to be adjusted front to back (e.g., its differential pitch) and to be adjusted side to side (e.g., its differential roll). Furthermore, the dashboard 50 may present a bulls-eye chart 90 which graphically depicts the differential pitch and differential roll between the chassis 12 and mower deck 32 as a point 92 on the chart. Such a depiction may aid an operator to better understand the adjustment needed in order to bring the point 92 back to center.

Figure 6:
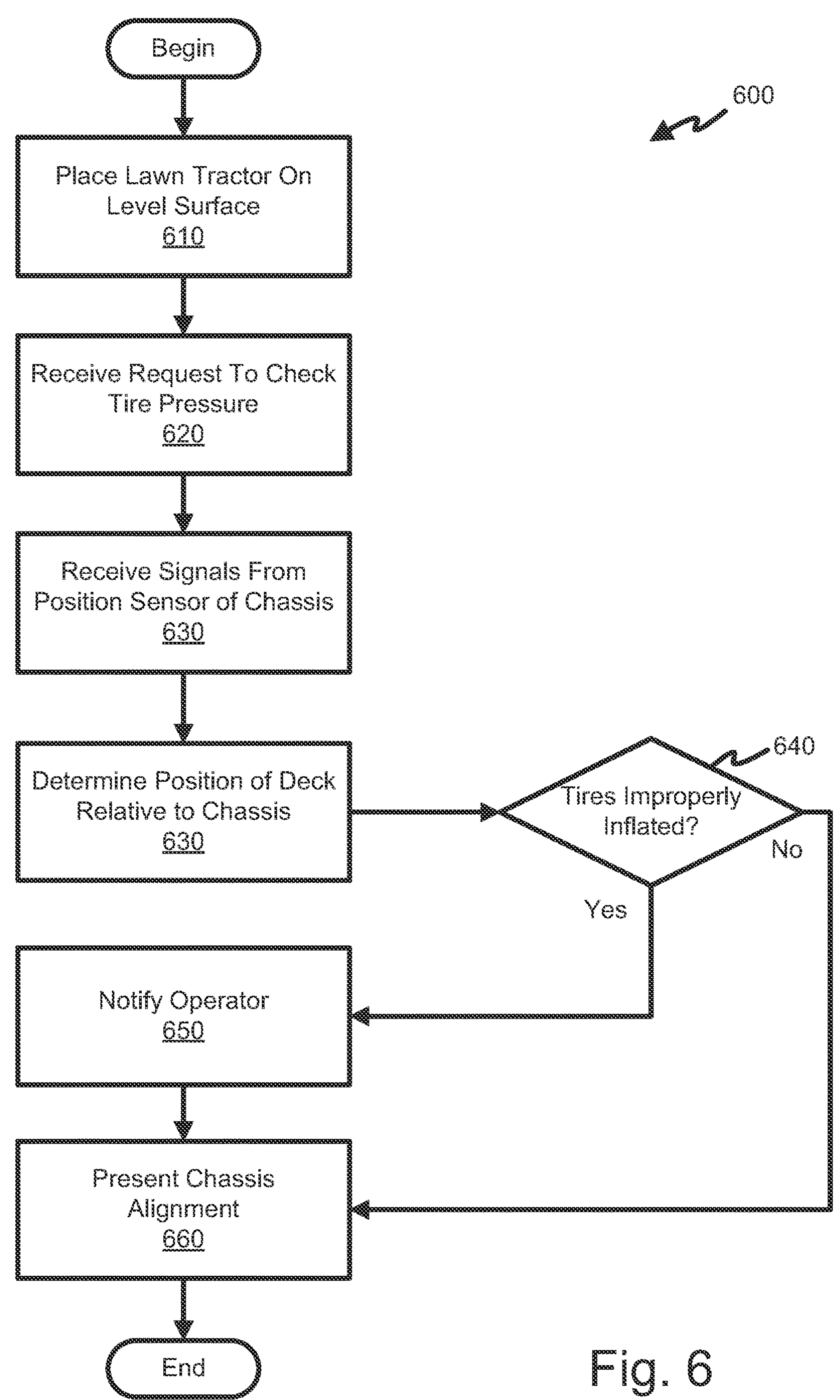
FIG. 6 shows a flowchart of an example method which may be implemented by the controller to detect improperly inflated tires of the lawn tractor of FIG. 1.

Referring now to FIG. 6, a flowchart is depicted for an example method 600 for indirectly testing the tire pressure of the one or more the tires 18, 20. To this end, the operator at 610 may place the lawn tractor 10 on a level surface in order to return the lawn tractor 10 to a known reference point to which the lawn tractor 10 was calibrated during manufacture. In some embodiments, the controller 80 may permit the operator to recalibrate the reference point to a different surface, which may not be level, by having the operator place the lawn tractor 10 on such surface, and then request recalibration via one or more user input devices 72. At 620, the controller 80 may receive, via one or more of the user input devices 72, a request from the operator to test or check the tire pressure of the one or more tires 18, 20.

In response to such request, the controller 80 at 630 may receive one or more signals from the position sensor 40 attached to the chassis 12. The signals received from the position sensor 40 may be indicative of a position of the chassis 12. In particular, the signals may be indicative of the tilt or the yaw, pitch, and roll of the chassis 12 with respect to the reference point associated with the surface.

At 640, the controller 80 may determine, based on the signals received from the position sensor 40 attached to the chassis 12 whether one or more tires 18, 20 may be improperly inflated. To this end, the controller 80 may determine that one or more tires 18, 20 may be improperly inflated in response to determining that the tilt, yaw, pitch, or roll of the chassis 12 with respect to the reference point is greater than a respective threshold. If the tires 18, 20 are properly inflated, the chassis 12 should be level when the lawn tractor 20 is placed on a level surface. Thus, if the controller 80 determines that the chassis 12 is not within an appropriate operating range of being level, then one or more of the tires 18, 20 may be improperly inflated. As such, the controller 80 at 650 may transmit one or more signals to the dashboard 50 to cause the dashboard 50 to display or otherwise present a notification that the air pressure of one or more tires 18, 20 may be improper. Regardless of whether the controller 80 detects that the chassis 12 is not within an appropriate operating range, the controller 80 at 660 may transmit one or more signals to the dashboard 50 or presentation device 54 to cause the dashboard 50 or presentation device 54 to present information regarding the current position of the chassis 12. The operator based on such presented information may verify the alignment of the chassis 12 or determine which tire 18, 20 to inflate.

In above describe embodiment process 600, the controller 80 notifies the operator when the chassis 12 is misaligned due to improper tire pressure. However, in some embodiments, the controller 80 in response to such a determination may generate one or more control signals which cause compressor 46 to inflate one or more tires 18, 20. By inflating one or more tires 18, 20 via compressor 46, the controller 80 may correct the alignment of the chassis 12 such that the chassis 12 is within the appropriate operating range.

While the present invention has been described with reference to certain embodiments, it will be understood by those skilled in the art that various changes may be made and equivalents may be substituted without departing from the scope of the appended claims. In addition, many modifications may be made to adapt a particular situation or material to the teachings of the disclosed embodiments without departing from its scope. Therefore, the appended claims are not to be limited to the particular embodiment or embodiments disclosed, but to encompass all embodiments falling within their scope.

What is claimed is:

1. A method comprising:

a sensor, coupled to a vehicle, for:

generating a tilt signal indicative of a tilt of a chassis of the vehicle with respect to a deck of the vehicle;

generating an inflation signal indicative of at least one tire of the vehicle having improper air pressure;

in response to detecting the improper air pressure, automatically adjusting a tilt reference baseline, used to interpret the tilt signal, prior to generating a deck alignment signal by compensating the tilt signal to remove a tilt component attributable to the improper air pressure, determining the deck alignment signal indicative of a recommended realignment of the deck according to the compensated tilt signal and the inflation signal, and outputting the deck alignment signal without operator intervention, wherein the tilt reference baseline is adjusted such that the deck alignment signal is generated independent of tilt caused by the improper air pressure.

2. The method of claim 1, comprising:

presenting, via a dashboard of the vehicle, a notification of which tire has improper air pressure.

3. The method of claim 1, comprising:

receiving, via an input device of the vehicle, a request to check air pressure of a plurality of tires.

4. The method of claim 1, comprising:

receiving, via an input device of the vehicle, a request to recalibrate the vehicle according to a flat surface.

5. The method of claim 1, comprising:

comparing the tilt of the chassis as indicated by the tilt signal to a reference point associated with a reference surface; and determining that one or more tires of the vehicle has improper air pressure according to the tilt of the chassis not being within an predetermined range of the reference point.

6. The method of claim 1, comprising:

displaying an alignment of the chassis, as indicated by the tilt signal, on a dashboard of vehicle.

7. The method of claim 1, comprising:

causing a compressor of the vehicle to inflate one or more tires of the vehicle.

8. The method of claim 1, comprising:

transmitting, via a wireless communication interface, a notification indicative of one or more tires of the vehicle having improper air pressure.

9. The method of claim 1, comprising:

transmitting, via a wireless communication interface, data indicative of the tilt of the chassis.

10. A sensor comprising:

circuitry configured to:

generate a tilt signal indicative of a tilt of a chassis of a vehicle with respect to a deck of the vehicle generate an inflation signal indicative of at least one tire of the vehicle having improper air pressure; and in response to detecting improper air pressure:

automatically adjust a tilt reference baseline, used to interpret the tilt signal, prior to generating a deck alignment signal by compensating the tilt signal to remove a tilt component attributable to the improper air pressure, determine the deck alignment signal indicative of a recommended realignment of the deck according to the compensated tilt signal and the inflation signal, and output the deck alignment signal without operator intervention, wherein the tilt reference baseline is adjusted such that the deck alignment signal is generated independent of tilt caused by the improper air pressure.

11. The sensor of claim 10, wherein the circuitry is configured to:

present, via a dashboard of the vehicle, a notification of which tire has improper air pressure.

12. The sensor of claim 10, wherein the circuitry is configured to:

receive, via an input device of the vehicle, a request to check air pressure of a plurality of tires.

13. The sensor of claim 10, wherein the circuitry is configured to:

receive, via an input device of the vehicle, a request to recalibrate the vehicle according to a flat surface.

14. The sensor of claim 10, wherein the circuitry is configured to:

compare the tilt of the chassis as indicated by the tilt signal to a reference point associated with a reference surface; and determine that one or more tires of the vehicle has improper air pressure according to the tilt of the chassis not being within an predetermined range of the reference point.

15. The sensor of claim 10, wherein the circuitry is configured to:

display an alignment of the chassis, as indicated by the tilt signal, on a dashboard of vehicle.

16. The sensor of claim 10, wherein the circuitry is configured to:

cause a compressor of the vehicle to inflate one or more tires of the vehicle.

17. The sensor of claim 10, wherein the circuitry is configured to:

transmit, via a wireless communication interface, a notification indicative of one or more tires of the vehicle having improper air pressure.

18. The sensor of claim 10, wherein the circuitry is configured to:

transmit, via a wireless communication interface, data indicative of the tilt of the chassis.

* * * * *